United States Patent
Evalds

[15] 3,679,871
[45] July 25, 1972

[54] TEMPERATURE CONTROL CIRCUIT EMPLOYING A VARIABLE RESISTANCE HEATING ELEMENT

[72] Inventor: Egils Evalds, 124 Linwood Ave., Ardmore, Pa. 19003

[22] Filed: Jan. 5, 1971

[21] Appl. No.: 104,075

[52] U.S. Cl. ............................................219/499, 219/501
[51] Int. Cl. ..............................................................H05b 1/02
[58] Field of Search......................219/499, 501; 315/209 SC

[56] References Cited

UNITED STATES PATENTS

| | | | |
|---|---|---|---|
| 3,215,818 | 11/1965 | Deaton | 219/499 |
| 3,316,449 | 4/1967 | Quinn | 315/209 SC |
| 3,431,901 | 3/1969 | Roger | 315/209 SC |

Primary Examiner—Bernard A. Gilheany
Assistant Examiner—F. E. Bell
Attorney—William E. Cleaver

[57] ABSTRACT

The present circuit employs a heating element whose electrical resistance varies in response to the heat generated thereby. The heating element comprises one leg of a bridge circuit and the output signal from the bridge circuit is connected to fire a silicon-controlled rectifier. The silicon-controlled rectifier is connected to short out a leg of the bridge circuit which is serially connected to the heating element thereby providing full power for energizing the heating element when the silicon-controlled rectifier is turned on and simply providing control current to the heating element when the silicon-controlled rectifier is turned off.

3 Claims, 2 Drawing Figures

PATENTED JUL 25 1972          3,679,871

INVENTOR.
EGILS EVALDS
BY William E. Cleaver
ATTORNEY.

TEMPERATURE CONTROL CIRCUIT EMPLOYING A VARIABLE RESISTANCE HEATING ELEMENT

BACKGROUND

In prior art temperature control systems, it has been the practice to provide a sensing circuit and a heating circuit. In such prior art arrangements the temperature responsive element, or sensor, of the sensing circuit had to be located in close proximity to the heating element in order to monitor the device being heated. Hence in such prior art temperature control arrangements there had to be at least four terminal connections to the device (furnace, room, etc.) being controlled and/or monitored, i.e., two connections for the sensing device and two connections for the heating device. In the present invention there are simply two terminal connections because there is only one circuit (a combination sensing circuit and heating circuit) and accordingly the control arrangement is less costly (because there are fewer components) and more reliable (because there are fewer connections and fewer components to fail).

As can be readily understood, with the prior art circuits there are problems of thermal inertia. In other words, traditionally there has been a separate sensing circuit and a separate heating circuit in the prior art arrangements. With such arrangements there is a time lag between the moment in time that the sensing circuit determines that no more heat is needed (or in the alternative more heat is needed) and that moment in time that the sensing circuit acts to completely turn off the switches to cut off the power to the heating element (or in the alternative to supply power to the heating element). In the present circuit there is virtually no overshoot, or thermal inertia, because the heating element does double duty, i.e., it acts as the source of heat for the device being heated and it also acts as a sensing circuit to fulfill the monitoring role of the same circuit. Accordingly, as the heating element generates heat in the present circuit, its own resistance is caused to vary and at the instant in time that that heating element temperature is at the threshold value or desired value, it acts to cut off (or in the alternative, turn on) the generation of heat. There is virtually no time delay in turning off (or turning on) the generation of heat.

The present circuit has great application in arrangements wherein it is difficult to place a sensing probe. For instance, in a rotating drum which is being heated (by way of example, in the manufacture of certain synthetic fibers) it is difficult to locate a probe.

The present circuit has great utility in this kind of a device and other devices or arrangements where it would be more convenient to use the heating element as the sensing element as well as the source of heat.

SUMMARY

The present circuit is taught in both the half-wave and full-wave mode of operation. The circuit employs an alternating current signal source connected to a bridge circuit. One leg of the bridge circuit is the heating element which provides heat to the utility device. The heating element is fabricated from a material having a positive temperature coefficient such as Balco wire, manufactured by the Driver-Harris Co. It should be understood that other materials such as nickel iron alloys may be used as heating elements, the prerequisite being that the heating element should have a useable change in resistance with a change in temperature. In series connection with this last mentioned leg there is a large valued resistor which constitutes a second leg of the bridge circuit. Across this second leg of the bridge circuit is connected a silicon-controlled rectifier which has a control element further connected to the tap of a variable resistor. The setting of the variable resistor represents the setting of the desired temperature. When the temperature of the heating element is colder than the desired temperature (and this example presupposes that the device prior to heating is changing from a relatively warm condition to a relatively cold condition) the bridge circuit will provide a difference of potential across the control element and the cathode element of the silicon-controlled rectifier, thereby turning on the silicon-controlled rectifier. When the silicon-controlled rectifier conducts it will "short circuit" the above-mentioned second leg of the bridge circuit thereby providing full power across the heating element.

If the system is operating in the half-wave mode of operation the heating element will be turned on only during every other half cycle, if indeed the temperature condition of the device warrants that the circuit is to be turned on at all. On the other hand, if the circuit is operating in the full wave mode of operation, the heating element will be turned on during every half cycle in which the heating element, acting as a sensor, determines that heat is needed. In both modes of operation, the circuit provides that one side of the line can be grounded so that there is no need to double-fuse the circuit arrangement to provide a safety factor (for the components of the circuit) against a heavy surge of current resulting from a spurious circuit connection.

The features and objects of the present invention will become more apparent in conjunction with the study of the drawings wherein.

Figure 1:
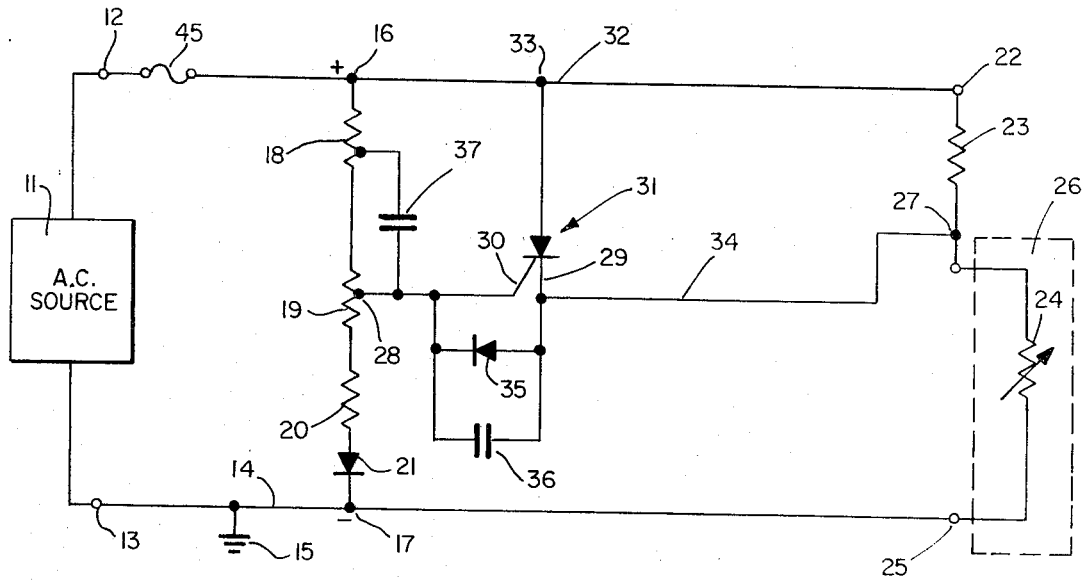
FIG. 1 is the present circuit connected to operate in the half-wave mode of operation.

Consider FIG. 1 wherein there is shown an alternating current signal source 11 connected to the terminals 12 and 13. It will be noted that the terminal 13 is connected to the line 14 which is further connected to ground 15. Accordingly, then the line 14 is the grounded line of the circuit arrangement. Further it will be noted that the terminal 12 is connected to a fuse 45 the purpose of which is to protect components of the circuit in the event that some one or more portions of this circuit become grounded or shorted independent of the ground connection to line 14.

Since the circuit in FIG. 1 has already been indicated as a circuit which operates in the half-wave mode of operation, let us consider the circuit only as it operates during the positive half cycles of the applied alternating current signal source. During a positive half cycle there would be a voltage applied between the terminals 16 and 17 which would assume the voltage polarities shown in FIG. 1. Accordingly, there would be current passing from the terminal 16 through the resistors 18, 19, 20 and the diode 21 to the terminal 17. At the same time the same voltage would be applied to the upper terminal 22 (of the resistor 23) across the resistor 23 and the heating element 24 to the terminal 25. The heating element 24 is shown as a variable resistor to indicate that the electrical resistance of the heating element 24 varies in response to its change in temperature. The heating element 24 is located to heat up the utility device 26. As indicated earlier, in the preferred embodiment, the heating element 24 is made from Balco wire manufactured by the Driver-Harris Company although other forms of heating elements can be used provided that the heating element has a positive coefficient of temperature.

If the circuit of FIG. 1 is studied it can be seen that there is a bridge circuit which is composed of the resistor 18 and a portion of the resistor 19, constituting one leg; the remainder of resistor 19 is in series connection with the resistor 20 and the diode 21, constituting a second leg; the resistor 23 constituting a third leg; and the heating element 24 constituting the fourth leg. The output signal from the bridge circuit just described can be obtained by connecting a circuit to the terminal 27 and to the tap 28 of the adjustable resistor 19. Actually the tap 28 represents a dial which can be set to obtain the desired temperature at which the system should operate as will become apparent hereinafter. The output signal from the bridge circuit is connected across the cathode 29 and the control element 30 of the silicon-controlled rectifier 31. The anode of the silicon-controlled rectifier 31 is connected to the upper line 32 at the terminal 33.

As should be apparent, in accordance with the theory of operation of a bridge circuit, if the electrical resistance value of resistor 23 is equal in value to the resistors 18 plus the portion of the resistor 19 which makes the first leg of the left hand side of the bridge and if the electrical resistance of the heating element 24 equals the electrical resistance of the lower half of the resistor 19 plus the resistor 20 and the electrical resistance of the diode 21 then the bridge circuit will be balanced and there will be no difference in potential across the control element and the cathode element of the silicon-controlled rectifier 31. Accordingly, the silicon-controlled rectifier 31 will not conduct or fire. It is also well understood that the changing of the electrical resistance in any of the bridge legs will generate a difference of potential across the control element and cathode element of the silicon-controlled rectifier 31. For instance, if the tap on the resistor 19 is changed by a new setting of the dial, the bridge will become unbalanced and there will be a difference of potential across the control element and the cathode element of the silicon-controlled rectifier 31, thereby causing it to conduct.

Consider a situation wherein the tap 28 has been set to a desired temperature value (which is translated into a resistance value through the variable resistor 19) and further wherein the utility device 26 is relatively cold thereby indicating a relatively cold heating element and hence a relatively low resistance for the heating element 24. At the beginning of the positive half-cycle there will be current flow between the terminals 16 and 17 and between the terminals 22 and 25. Since under the previously stated conditions the resistance of the heating element 24 is relatively low (the temperature being relatively cold) there will be a smaller voltage drop from the terminal 27 across the heating element to terminal 25 than there will be from the tap position 28 across the part of the resistor 19, the resistor 20, and the diode 21 to terminal 17. Accordingly, the control element 30 will be positively biased with respect to the cathode 29 and the silicon-controlled rectifier will be turned on. Since the silicon-controlled rectifier 31 employed herein normally requires a .6 volt difference of potential to cause it to conduct there is some period of time that lapses between the zero crossover time of the positive half-cycle and the time at which the silicon-controlled rectifier does conduct. When this silicon-controlled rectifier conducts there is current flow from the terminal 33 through the silicon-controlled rectifier 31 along the line 34 to the terminal 27, through the heating element 24, to the terminal 25 and hence to the other side of the line. When the silicon-controlled rectifier 31 conducts the resistor 23 will be shorted out of the circuit and full power from the alternating current source 11 is applied to the heating element 24 to cause the heating element to heat up in accordance with the proposition that $I^2R$ = watts or heat.

Once the silicon-controlled rectifier 31 commences to conduct the cathode 29 will be at virtually the same potential as the point 33 and there would be a great tendency for internal arcing to take place between the cathode 29 and the control element 30 under these circumstances. Accordingly, the diode 35 is added to the circuit to permit current to be transmitted from the cathode 29 to the tap 28 and protect the silicon-controlled rectifier under these conditions. The capacitor 36 is simply added to take care of the high frequency signals which often occur under these conditions and to eliminate susceptability to power line noise.

The silicon-controlled rectifier 31 is like a thyratron, in that once it is turned on it will continue to conduct until either the anode or the cathode has had its voltage reduced to zero or removed. In the case under consideration of course the silicon-controlled rectifier 31 will conduct for the remainder of the positive half cycle and apply current to the heating element 24 to cause that element to produce heat. Now as the heating element 24 produces heat the temperature commences to increase and therefore its resistance increases. Hence the voltage at point 27 commences to increase in accordance with the increased voltage drop across the heating element 24. During the negative cycle which follows, the heating element will not generate heat but will retain some heat from the positive half-cycle experience. During the following positive half-cycles the heating element 24 will be subjected to repeated bursts of power and therefore will continue, on the positive half cycles, to generate heat thereby increasing its resistance value. When point 27 develops a potential value equal to the potential at the point 28 the silicon-controlled rectifier 31 will no longer conduct and hence the heating element (and the utility device 26) will be at the desired temperature.

The system as just described operates quite satisfactorily but not in its most efficient mode for two reasons. In the first place since there has to be a difference of potential between the control element 30 and the cathode 29, the silicon-controlled rectifier may not fire until quite late in the cycle, i.e., when the amplitude of the voltage signal has risen substantially. In order to overcome this problem the capacitor 37 is connected into the circuit as shown to cause a phase shift whereby the voltage developed at the tap 28 leads the voltage developed at the terminal 27. In this manner the silicon-controlled rectifier 31 can be turned on relatively early in the half cycle, thus making the system more efficient. However, it will be noted that the capacitor 37 is connected in such a manner to the resistor 18 that the system will not operate on the zero crossover of the positive half cycle. This is necessary in order to provide a sufficient amount of time to keep the resistor 23 in an "unshorted" condition or actively in the circuit to provide control current across the heating element 24. In other words, the point 27 should be subjected to a condition where there is current flowing across resistor 23 and the full bridge circuit is in operation in order to develop the control signal between the point 27 and the point 28. This occurs during the early part of the positive half cycle before the silicon-controlled rectifier 31 has been fired. It is during this early portion of the positive half cycle that the difference of potential between the control element 30 and the cathode 29 is developed if in fact it is going to be developed. Considering this operation further, if immediately prior to a given positive half cycle, the heating element 24 has been heated to a point where the resistance thereof develops a potential at point 27 which is equal to the potential at point 28, then the silicon-controlled rectifier 31 will not fire or be turned on at any time during that positive half cycle. In effect it will be a half cycle during which time there will be no additional heat generated by the heating element 24, and the heating element 24 may in effect commence to cool in that half cycle or subsequent half cycles during which no heat is generated. Of course once the heating element 24 has cooled to a point where its resistance has diminished so that the voltage at point 27 becomes sufficiently negative (i.e., .6 volts in the preferred embodiment) relative to the voltage at the tap 28, then once again the silicon-controlled rectifier 31 will be turned on thereby shorting out the resistor 23 and applying the full power of the alternating current source to the heating element 24.

It has been my experience that (especially in industrial control operations wherein this kind of circuit has its greatest utility), there very often results a spurious circuit connection to ground (a short circuit) due to moving the equipment around or having people who are working on such a system improperly cut into wires, etc. If such a connection were to be made, for instance, to the lower line of the present circuit, nothing disasterous would happen to the components of the circuit because the lower line 14 of this circuit is already grounded and the components of the circuit would see no effective changes in the system. On the other hand if the components of the present circuit which are connected to the upper line 32 were to be erroneously connected to ground and be subjected to the full power of the alternating current source they might become damaged. Accordingly the fuse 15 is added to the circuit. The present circuit is specifically designed to have one side grounded which removes the necessity of double fusing or having a fuse in both lines and hence provide a better safety factor for the overall system.

Diode 21 is employed in the circuit to provide the .6 volt drop which represents the voltage difference or bias necessary to fire the silicon-controlled rectifier 31. The voltage drop across diode 21 will follow the voltage difference necessary to cause the silicon-controlled rectifier 31 to conduct, if this value should change due to ambient changes. Accordingly, then, the bridge is actually balanced or unbalanced in response to a comparison between the resistance values on the left-hand side of the bridge with the resistance values of resistors 23 and 24 on the right-hand side of the bridge.

Figure 2:
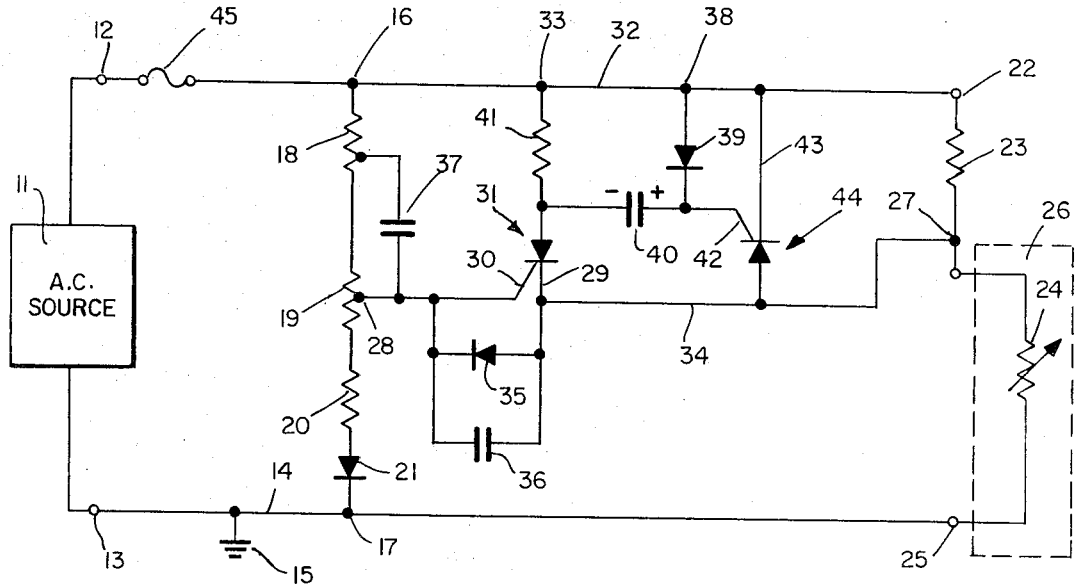
FIG. 2 is the present circuit connected to operate in the full-wave mode of operation.

Consider FIG. 2 which shows the circuitry necessary for a full-wave mode of operation. All of the circuit components which are shown in the circuit of FIG. 1 bear the same identification numerals in FIG. 2 and the description of the circuit insofar as those components are included remains the same. As indicated before the half-wave mode of operation would be inefficient for two reasons, one of these reasons, i.e., the fact that the SCR would fire late in the half cycle has already been discussed and the compensation therefor was the addition of the capacitor 37. The second reason that the half-wave mode of operation is inefficient is because only one half of the cycle is employed. The circuit shown in FIG. 2 can provide full power to heating element 24 during each half of the cycle. It would appear reasonable that if a designer were going to transform the circuit of FIG. 1 into a full wave mode of operation he would simply put a full wave rectifier between the alternating current source 11 and the terminals 12 and 13. However, if this were done the circuit would be floating with respect to the full wave rectifier and hence both sides would have to be fused because a grounded condition on any portion of the circuit might burn out the components of the circuit. The circuit shown in FIG. 2 does not employ a full-wave rectifier but continues to have one side of the circuit grounded for protection of the components as described earlier and is connected in such a way that only the upper line need include a fuse.

In our consideration of the operation of the circuit, in FIG. 1, we studied that operation in connection with the positive half cycle. In addition to what was said about the operation of the circuit in FIG. 1, it should be understood that in the circuit of FIG. 2, during the positive half cycle of operation, there would be current flow from the terminal 38 through the diode 39 to charge up the capacitor 40 in accordance with the polarity shown. The resistor 41 simply provides the resistance for the R-C time constant when the capacitor 40 is being discharged as will be described hereinafter below.

When the alternating current source provides the negative half cycle, the line 32 becomes negative and the control element 42 which is connected to the positively charged side of the capacitor 40 is positively biased with respect to the cathode 43. Hence the silicon-controlled rectifier 44 is fired or turned on. When the silicon-controlled rectifier 44 is turned on there is current flow from the terminal 25, through the heating element 24 to the terminal 27, through the silicon-controlled rectifier 44 to the upper line 32. During this period the capacitor 40 is able to discharge through the silicon-controlled rectifier 44 back through the resistor 41. Actually the potential developed across the capacitor 40 is of such a value that the silicon-controlled rectifier 44 is conditioned to be turned on at the end of the positive half cycle and therefore immediately upon the zero crossover to the negative half cycle the silicon-controlled rectifier 44 is turned on. It will be recalled that in the discussion of the circuit in FIG. 1 it was pointed out that during the positive half cycle the system should not fire at the zero crossover in order to provide control signal time. However, since it is sufficient to monitor or control once per cycle, it is not necessary to use part of the negative half of the cycle to sense the heater condition. Accordingly then during the early part of each positive half cycle the system is monitored and if there is a difference signal developed by the bridge circuit, the silicon-controlled rectifier 31 will be turned on for the remainder of the positive half cycle while the silicon-controlled rectifier 44 will be turned on for the full negative half cycle.

Because the system has virtually no thermal inertia there is good resolution. In other words, when the heating element itself develops an electrical resistance which is greater or lower than the threshold (i.e., the selected value of tap 28 of resistor 19) the system responds immediately. The circuit provides great advantages for a system requiring relatively large amounts of heat. For instance, in a system requiring 100 watts, there is virtually no power dissipation required by any of the components excepting the heating element itself, because once the system has been turned on, the only component involved in the circuit to which the full power is applied is the silicon-controlled rectifier. Accordingly, the system can handle large power dissipation without injury to any of the components.

I claim:

1. A temperature control circuit comprising in combination:

first and second electrical energy input lines;

first voltage divider circuit means having first and second terminals respectively connected to said first and second electrical energy input lines;

heating member means having third and fourth terminals and being capable of being electrically energized to provide heat and having an electrical resistance characteristic which varies with the heat being so generated, said fourth terminal being connected to said second electrical energy input line;

first electrical resistor means having fifth and sixth terminals, said sixth terminal being connected to said third terminal of said heating member means and said fifth terminal being connected to said first electrical energy input line;

electrical current switching means having an input element, an output element and a control element, said input element being connected to said first electrical energy input line, first circuitry means connecting said output element to said third terminal and said control element being connected to said first voltage divider circuit at a variable point between said first and second terminals, whereby when there develops a predetermined difference of potential between said control element and said output element in response to the electrical resistance developed by said heating member means, said current switching means conducts electrical current to said heating member means thereby by-passing said first electrical resistor means and whereby when there develops a lack of said predetermined difference of potential, said current switching means is non-conductive; and voltage phase shifting means connected between a predetermined point on said first voltage divider circuit and said variable point whereby the voltage applied to said control element is out of phase with the voltage applied to said output element so that said current switching means can be switched relatively earlier in an applied electrical energy cycle than would occur without said out of phase condition.

2. A temperature control circuit according to claim 1 wherein there is included a second current switching means having an input element, an output element and a control element, said input element being connected to said first circuitry means, said output element being connected to said first electrical energy input line; second circuitry means connecting said control element of said second current switching means to said first electrical energy input line whereby a voltage is developed and stored thereby during the time when said first current switching means is conducting and characterized such that said developed voltage turns on said second current switching means during the time that said first current switching means is rendered non-conducting thereby conducting electrical current through said heating member from said second electrical energy line to said first electrical energy line.

3. A temperature control circuit according to claim 1 wherein there is further included a silicon-controlled rectifier having an input element, an output element, and a control element, said input element being connected to said first circuitry means, said output element being connected to said first electrical energy input line, and wherein there is further included a resistor connected between the input element of said first current switching means and said first electrical energy input line and wherein there is further included a capacitor connected between said input element of said first current switching means and said control element of said silicon-controlled rectifier and wherein there is further included a diode connected to conduct current between said first electrical energy input line to said capacitor to charge said capacitor whereby when said first current switching means is conducting said capacitor is charged in such a way that said silicon-controlled rectifier is biased to conduct in response to a polarity change of the electrical signal applied to said first and second electrical energy input lines.

* * * * *